United States Patent [19]
Conseiller et al.

[11] 3,721,669

[45] March 20, 1973

[54] PROCESS FOR THE NITROSYLATION OF ORGANIC COMPOUNDS

[75] Inventors: Yvon G. M. Conseiller, Paris; Gerard J. Fontaine, Choisy-Le-Roi, both of France

[73] Assignee: Rhone-Poulene S.A., Paris, France

[22] Filed: Sept. 18, 1970

[21] Appl. No.: 73,621

[30] Foreign Application Priority Data

Sept. 22, 1969  France..................................6932160

[52] U.S. Cl..........260/248.5, 260/621 R, 260/268 PH
[51] Int. Cl. ...............................................C07d 55/52
[58] Field of Search......................260/248.5, 248 RS, 260/621 R, 268 PH, 248.5

[56] References Cited

UNITED STATES PATENTS

| | | | |
|---|---|---|---|
| 2,959,587 | 11/1960 | Johnson et al. | 260/248 |
| 3,133,054 | 5/1964 | Wright et al. | 260/248 X |
| 3,575,974 | 4/1971 | Hodge | 260/248 |

OTHER PUBLICATIONS

Bell, J. Chromatog., Vol. 24, pp. 253–257 (1966). QD 241.J5

*Primary Examiner*—John M. Ford
*Attorney*—Stevens, Davis, Miller & Mosher

[57] ABSTRACT

Organic compounds are nitrosylated with nitrous fumes which are essentially free from molecular oxygen, and in which the molar ratio of nitric oxide to nitrogen peroxide is at least 9:1. An advantage of the process is that the product is free from alkali metal salts, so facilitating recovery of the product and re-use of material in the mother liquor. For example, in the production of dinitrosopentamethylenetetramine, by-product formaldehyde can be reconverted into hexamethylenetetramine by adding ammonia, and the mother liquor containing this regenerated hexamethylenetetramine recycled.

8 Claims, No Drawings

PROCESS FOR THE NITROSYLATION OF ORGANIC COMPOUNDS

This invention relates to a process for the nitrosylation of organic compounds in the liquid phase by means of nitrous fumes.

The known nitrosylation processes have generally used an alkali metal nitrite in an acid medium (for example sulphuric, acetic, nitric or hydrochloric acid) as the nitrosylating agent. These processes suffer from the disadvantage of introducing a rather large amount of alkali metal salts into the reaction mixture, which has the effect of complicating the recovery of the mother liquors. Furthermore, at the low temperatures at which the process is most frequently carried out, near 0°C., the nitrosylated product can retain a large amount of alkali metal salt when it precipitates.

A process for the nitrosylation of organic compounds in the liquid phase by nitrous fumes has now been discovered, which is characterized by the fact that the nitrous fumes do not contain molecular oxygen when they are introduced into the reaction medium, and that the molar ratio of nitric oxide to nitrogen peroxide $NO/NO_2$ is at least 9:1.

"Nitrous fumes" comprise all gaseous mixtures equivalent to mixtures of NO and $NO_2$, with or without molecular oxygen. They can for example be obtained by reduction of nitric acid or of nitrates, by catalytic combustion of ammonia, or by decomposition of nitrogen sesquioxide. However, the mixtures so obtained generally do not contain nitrogen oxides in the molar ratio required for carrying out the invention, and for this purpose they must be enriched with nitric odixe, NO. To obtain nitrous fumes practically free from oxygen, it suffices to cool them to below 20°C. At this temperature the thermodynamic equilibrium is sufficiently displaced in favor of the formation of the nitrogen peroxide for practically no molecular oxygen to remain. A mixture of nitric oxide and oxygen in which the molar ratio of nitric oxide/oxygen is at least 20:1 can, if cooled below 20°C., also be used for carrying out the process of the invention. The use of an excess of nitric oxide makes it possible to avoid the partial formation of dinitrogen pentoxide $N_2O_5$, which gives rise to side-reactions such as nitration or decomposition of the organic reagents. The excess nitric oxide leaving the reactor is recycled.

It is advantageous to carry out the process at a temperature which is not too high, i.e. is below 20°C. and generally between +15° and −5°C. and preferably between 10° and 2°C., so as to favor the production of nitrous acid in the reaction medium. Furthermore, it is preferable to ensure intimate contact between the gaseous reagents and the liquid phase by efficient stirring. Gas-recirculating turbine stirrers are particularly suitable for this purpose.

Examples of the application of the invention are the conversion of phenol to p-nitroso-phenol, of 1,4-diphenyl-piperazine to 1,4-di-p-(nitrosophenyl)-piperazine, and of hexamethylenetetramine to dinitrosopentamethylenetetramine. It can however be used in nitrosylations generally.

The nitrosylation of hexamethylenetetramine can be represented by the following equation:

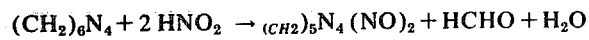

$$(CH_2)_6N_4 + 2\,HNO_2 \rightarrow {}_{(CH_2)_5}N_4(NO)_2 + HCHO + H_2O$$

In the known processes, the formaldehyde liberated by this reaction is difficult to recover from the final reaction mixture, which contains a large amount of alkali metal salt. In the process of the invention the formaldehyde liberated is easily recoverable simply by treating the mother liquors, at the end of the reaction, with ammonia, which converts the formaldehyde into hexamethylenetetramine. These mother liquors can then be recycled to subsequent operations.

The actual nitrosylation reaction is in this case advantageously carried out at a temperature between 2° and 5°C. and at a pH of between 7 and 3.

The following example is given by way of illustration.

EXAMPLE 8 kg of water and 1.4 kg of hexamethylenetetramine (10 mols) are introduced into a 30 liter polished stainless steel reactor equipped with a MORITZ turboabsorber.

The atmospheric gases are flushed from the reactor with nitrogen, the mixture is cooled and kept at +5°C. by circulating brine, stirring is started, the reactor is connected to a nitric oxide gasholder, and nitric oxide is passed through the reactor at the rate of 800 l/hour, with recycling. 40 l/hour of oxygen are simultaneously introduced into the reactor, and react to form nitrogen peroxide before entering the reaction mixture. The pH of the reaction mixture drops from 6.5 to 3.5 after 4 hours under these conditions, and at the end of this time the rate of consumption of nitric oxide decreases.

The introduction of oxygen and nitric oxide is stopped, the reactor is flushed with nitrogen and the pH of the mixture is adjusted to 8 by injecting ammonia whilst keeping the temperature at +5°C. The resulting precipitate is filtered off and twice washed with 500 cm³ of iced water. After drying the precipitate, 1,335 g of dinitrosopentamethylenetetramine are obtained (yield 71.7 percent on the hexamethylenetetramine introduced).

The filtrate containing the hexamethylenetetramine regenerated by reaction of ammonia with the by-product formaldehyde is recycled to a subsequent operation, with 1.03 kg of further hexamethylenetetramine and sufficient water to make up to 8 kg of water. 1,487 g of dinitrosopentamethylenetetramine are thus obtained (yield 77.9 percent on the total hexamethylenetetramine, both freshly introduced and regenerated from the first operation).

The operation is restarted a further eight times as above, in each case with the unreacted and re-formed hexamethylenetetramine being recycled.

The details of the operations are summarized in the table:

|  | HMT recycled, unconverted and regenerated, in mols (calculated) | HMT effectively introduced | | Dry DNPT isolated | | Formaldehyde formed, in mols (calculated) |
| --- | --- | --- | --- | --- | --- | --- |
|  |  | Mols | Grams | Mols | Grams |  |
| 1st operation | 0 | 10 | 1,400 | 7.17 | 1,335 | 7.17 |
| 1st recycling | 2.65 | 7.35 | 1,030 | 7.99 | 1,487 | 7.99 |
| 2nd recycling | 3.34 | 6.68 | 935 | 7.79 | 1,450 | 7.79 |
| 3rd recycling | 3.5 | 6.5 | 910 | 7.33 | 1,364 | 7.33 |
| 4th recycling | 3.89 | 6.1 | 855 | 5.91 | 1,100 | 5.91 |
| 5th recycling | 5.07 | 4.93 | 690 | 7.95 | 1,480 | 7.95 |
| 6th recycling | 3.37 | 6.64 | 930 | 7.09 | 1,320 | 7.09 |
| 7th recycling | 4.09 | 5.90 | 825 | 7.31 | 1,360 | 7.31 |
| 8th recycling | 3.91 | 6.10 | 855 | 6.64 | 1,235 | 6.64 |
| 9th recycling | 4.46 | 5.52 | 773 | 5.80 | 1,080 | 5.80 |

NOTE.—In this table, hexamethylenetetramine has been abbreviated to HMT and dinitrosopentamethylenetetramine to DNPT.

We claim:

1. Process for the nitrosylation of phenol, 1,4-diphenyl-piperazine or hexamethylenetetramine in the liquid phase by nitrous fumes which are substantially free from molecular oxygen when they are introduced into the reaction mixture, and where the molar ratio $NO/NO_2$ in the nitrous fumes is at least 9:1.

2. Process according to claim 1, in which the nitrous fumes are introduced into the reaction zone at a temperature below 20°C.

3. Process according to claim 1, in which the nitrosylation is effected at a temperature of +15° to −5°C.

4. Process according to claim 3, in which the temperature is +10° to +2°C.

5. Process according to claim 1, in which the nitrous fumes used are obtained by mixing oxygen with at least 20 molar equivalents of nitric oxide at a temperature below 20°C., or by mixing the oxygen and nitric oxide at a temperature above 20°C. and cooling the mixture to a temperature below 20°C.

6. Process according to claim 1, in which dinitrosopentamethylenetetramine is formed by the nitrosylation of hexamethylenetetramine.

7. Process according to claim 6, in which the reaction is effected at a temperature of 2° to 5°C.

8. Process according to claim 6, in which the precipitate of dinitrosopentamethylenetetramine formed is separated from the reaction mixture, ammonia is added to the mother liquor to regenerate hexamethylenetetramine from by-product formaldehyde, and the regenerated hexamethylenetetramine is recycled.

* * * * *